Figure 1:
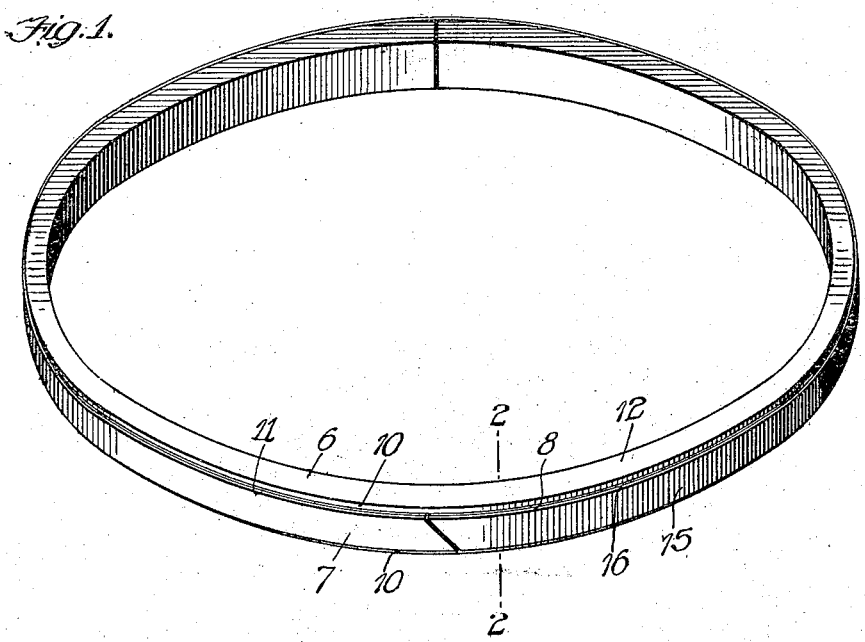

June 24, 1924.

F. L. HOESS ET AL

PISTON PACKING RING

Filed March 8, 1920

1,498,729

Frank L Hoess
John M Prince
Inventors

Witness
Martin H. Olsen

Patented June 24, 1924.

1,498,729

UNITED STATES PATENT OFFICE.

FRANK L. HOESS AND JOHN M. PRINCE, OF HAMMOND, INDIANA.

PISTON PACKING RING.

Application filed March 8, 1920. Serial No. 364,100.

*To all whom it may concern:*

Be it known that we, FRANK L. HOESS and JOHN M. PRINCE, citizens of the United States, residing at Hammond, in the county of Lake and State of Indiana, have jointly invented certain new and useful Improvements in Piston Packing Rings, of which the following is a specification.

Our improved ring is adapted for use in steam, gas and oil engines, pumps, compressors and the like where it is desired to produce a leak proof joint between a piston and cylinder with a minimum of friction, but has certain advantages in connection with internal combustion engines and therefore will be more specifically described in connection therewith.

The packing ring at present in common use in engines of this type is of relatively large cross-section, the resilience of the ring being depended upon to secure a close fit against the cylinder wall. The ring is cast larger than the interior of the cylinder in which it is to be used and a section of such length is cut out that when the ring is compressed and inserted in the cylinder with the ends nearly meeting it exerts a considerable pressure against the cylinder wall, such pressure being relied upon to secure the close contact with the cylinder wall necessary to prevent leakage. It is practically impossible, however, to secure more than an approximate fit in this manner, and, what is more important, it is impossible to provide equal pressure at all points between the ring and the cylinder wall. As a result there is usually considerable leakage at points about the periphery of the ring and the cylinder is worn and enlarged at the points of greater pressure so that when fresh rings, even of correct shape, are put in the fit is poor. Furthermore, in order to allow for expansion as the ring heats it is necessary that the gap between the ends of the ring be of such width that there is considerable leakage of fluid at this point.

The leakage at the gap has been reduced in some cases by overlapping the ends of the ring, by employing a bridge piece to guard the opening and by forming the ring of a plurality of annular elements with the split in the respective elements at different circumferential points. Whatever successes these modifications met have been accompanied by new difficulties peculiar to the specific construction resorted to. Among the difficulties resulting from the employment of such compound rings may be mentioned the clogging due to carbon which prevents or restricts the relative movement upon which the efficiency of ring depends.

Our improved packing ring is of the compound type, consisting of two annular elements or rings—an inner and an outer one—capable of a slight relative movement axially of the ring. The difficulty in regard to fit and uneven pressure is overcome by depending upon the pressure of the gas, steam or other medium in the engine, instead of the resiliency of the metal of the ring, to force the outer ring into close even contact with the cylinder wall, said outer ring being of relatively small cross-section and readily expansible for the purpose. Furthermore, in our improved ring the pressure of the outer ring against the cylinder wall, being dependent upon the pressure of the medium employed in the engine and not upon the resiliency of the metal of the ring, is considerable only when the pressure of the gas, steam or the like is high, as for example on the compression and working strokes of an explosion engine, the pressure and hence the friction being at other times relatively light, thus economizing power and saving the cylinder from unnecessary wear. Provision is also made by the shape and relative movement of the two parts of the compound ring to avoid clogging of the ring by carbon.

Figure 2:
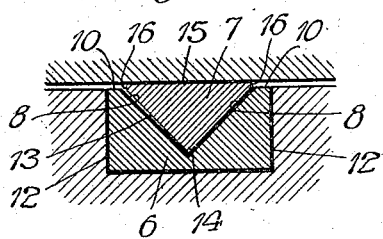
Figure 3:
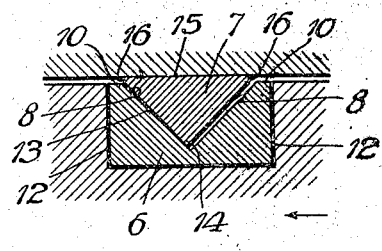

In the accompanying drawings Fig. 1 is a perspective view of our improved packing ring; Fig. 2 a transverse section therethrough on an enlarged scale showing the elements in the position which they assume when the engine is at rest; and Fig. 3 a similar section showing the position of the parts during the working stroke of the piston, the arrow indicating the direction of movement of the piston.

As heretofore stated, our improved piston ring comprises two annular elements or rings each of which is severed, the slits of the respective elements being located at different circumferential positions so that each bridges the slit of the other, thus largely preventing the passage of gas, etc., through the slits. The inner ring 6 is or may be of generally rectangular cross-section and fits within the groove of the piston substantially as do the piston rings heretofore in general use. The ring 6 is formed in its outer side with the groove 8 which is V-shaped in cross-section, the walls 9—9 of the groove being inclined to each other at an angle which may vary considerably and meeting sharply at the bottom of the groove, there preferably being no rounding or other relief of the angle between the walls at the bottom of the groove. We have found in practice an angle of approximately 90 degrees to be satisfactory. The groove 8 occupies nearly the full width of the outer periphery of the ring 6, there being slight cylindrical margins 10—10 between the edges 11—11 of the groove and the ends 12—12 of the ring.

The outer element or ring 7 is of a cross-section to approximately but not completely fill the groove in the inner element, being generally triangular in cross-section, the angle between the side surfaces 13—13 thereof being slightly less, preferably but a few degrees, than the angle between the walls 9—9 of the groove 8 in the inner element, and the surfaces 13—13 meeting at a sharp apex or edge 14. The corners between the inclined surfaces 13—13 and the cylindrical periphery 15 of the outer ring 7 are preferably cut away at 16—16 on parallel planes perpendicular to the axis of the ring.

Both elements of the ring are preferably made of medium hard gray iron and the inner ring is of somewhat smaller diameter than the internal diameter of the cylinder in which it is to be used, it being intended and desired that it shall never come into actual contact with the cylinder wall, being held from such contact by the outer ring as hereinafter described. It may be initially cast of the full diameter of the cylinder or even slightly larger, so that when a section of it is removed to form the slit or gap in it, it will have to be slightly compressed to permit it to enter the cylinder, but the expansive force of the ring is only sufficient to cause it to press the outer ring into contact with the cylinder wall with a slight pressure, such pressure not being depended upon to prevent leakage between the outer ring and cylinder wall. The outer ring, when seated in the groove of the inner ring, is of greater external diameter than the inner ring, so that its cylindical periphery may bear against the cylinder wall while the inner ring is held out of contact therewith. The outer ring is preferably cast of about the internal diameter of the cylinder, allowance being made for grinding, and the slit or gap in the ring is only such as to allow for expansion under the changes of temperature to which the ring is subjected. In neither ring is the resilience or spring of the metal relied upon to secure the effective pressure of the outer ring against the cylinder wall, but on the contrary the pressure of the gas, steam or other medium within the cylinder is utilized for expanding the outer ring and securing a close contact of it with the cylinder wall when necessary and desired, such ring being sufficiently pliable, by reason of its relatively small cross-section, to secure that result.

As before explained, the angle between the inclined sides of the outer ring is slightly less than the angle between the inclined walls of the groove in the inner ring, by reason of which fact when the outer ring is in symmetrical position with respect to the inner ring, as in Fig. 2, there is a very narrow slightly flaring space on each side of the outer ring, between it and the walls of the groove in the inner ring. When the pressure rises in the explosion end of the cylinder, as during the compression stroke of the piston, the pressure against the inclined or conical surface of the outer ring, on the pressure side, will expand said ring and will also force it against the opposite wall of the groove, and by reason of the conical or sloping conformation of the parts the outer ring will be forced outward against the wall of the cylinder, as in Fig. 3, thus securing a close contact therewith while at the same time it fits tightly against the opposite or low pressure wall of the groove, and when the explosion occurs such position of the parts is maintained by the increased pressure during the working stroke of the piston. In this manner close contact and tight fit of the outer ring with the cylinder wall is secured during the compression and working strokes of the piston, when such contact and fit are desired, while upon the other strokes of the piston, when there is no considerable pressure in the cylinder, the outer ring tends to return to its inner symmetrical position with respect to the inner ring and thus relieve friction upon the cylinder wall during those strokes of the piston. On the exhaust stroke of the piston the ring may remain in approximately symmetrical position, as in Fig. 2, while on the suction stroke it may be moved to a position opposite that shown in Fig. 3, both by the suction and by the drag of the cylinder wall upon it and thereby tend to prevent leakage past the piston without exerting any considerable pressure against the cylinder wall or producing any large amount of friction.

In this manner, and by reason of the fact that the internal pressure, rather than the spring of the metal of the ring is depended upon to secure the desired close contact between the ring and the wall of the cylinder, the wear on the latter is decreased and also made uniform and the friction is reduced to the minimum that will suffice to prevent leakage.

The internal diameter of the outer ring is approximately that of the bottom of the groove in the inner ring, so that as the outer ring expands under pressure and contracts as the pressure is relieved, and moves relatively to the inner ring, the sharp inner edge 14 of the outer ring will engage the carbon tending to accumulate in the bottom of the groove in the inner ring and prevent it being deposited therein.

We claim:

1. A compound piston ring comprising an inner ring adapted to be received in the packing groove of a piston and formed with an annular groove in its outer periphery, and an expansible outer ring seated in said groove with provision for permitting relative axial movement of the two rings whereby access of the pressure in the cylinder to the inner periphery of said outer ring provided for the purpose of expanding it and establishing close contact between its outer periphery and the cylinder wall.

2. A compound piston ring comprising an inner ring adapted to be received in the packing groove of a piston and formed in its outer periphery with an annular groove having inclined side walls, and an expansible outer ring seated in said groove and movable axially thereof to permit the pressure fluid to enter said groove and expand the outer ring.

3. A compound piston ring comprising an inner ring adapted to be received in the packing groove of a piston and formed in its outer periphery with an annular groove having inclined side walls, and an expansible outer ring seated in said groove and having its sides inclined inwardly toward each other at a less angle than the walls of the groove.

4. A compound piston ring comprising an inner ring adapted to be received in the packing groove of a piston and formed in its outer periphery with an annular groove having inclined side walls, and an expansible outer ring seated in said groove and having its sides inclined inwardly toward each other at a less angle than the walls of the groove and meeting at a sharp edge.

5. A compound piston ring comprising an inner ring adapted to be received in the packing groove of a piston, said ring being of substantially less diameter than that of the cylinder in which the ring is to be used and being formed in its outer periphery with a groove having inclined side walls, and an expansible outer ring of normally greater external diameter than the inner ring, said outer ring being seated in the groove in the inner ring and having its sides inclined inwardly at a less angle than the walls of the groove.

6. A compound piston ring comprising an inner ring adapted to be received in the packing groove of a piston and formed with an annular groove in its outer periphery, said groove having inclined side walls and being bounded on either side by plain cylindrical surfaces, and an expansible outer ring seating in said groove and having its side walls inclined toward each other at a less angle than the walls of the groove and terminating at their outer edges in plane surfaces at right angles to the axis of the ring.

7. A piston ring comprising two parts including an inner member and an outer member, said inner member having a circumferential groove between the side edges thereof with the side walls of the groove diverging outwardly from the bottom of the groove, said outer member being of less width than said inner member and having an inner projection having two inwardly diverging side walls extending into said groove of said inner member and engaging the inclined side walls of said groove to hold said outer member and said inner member in interlocking lateral sliding engagement with each other.

FRANK L. HOESS.
JOHN M. PRINCE.